(12) United States Patent
Colombo et al.

(10) Patent No.: US 9,278,642 B2
(45) Date of Patent: Mar. 8, 2016

(54) ELASTICALLY DEFORMABLE FLANGE LOCATOR ARRANGEMENT AND METHOD OF REDUCING POSITIONAL VARIATION

(71) Applicant: GM GLOBAL TECHNOLOGY OPERATIONS LLC, Detroit, MI (US)

(72) Inventors: Joel Colombo, Howell, MI (US); Steven E. Morris, Fair Haven, MI (US); Michael D. Richardson, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 201 days.

(21) Appl. No.: 13/856,973

(22) Filed: Apr. 4, 2013

(65) Prior Publication Data

US 2014/0301103 A1    Oct. 9, 2014

(51) Int. Cl.
*B60Q 1/04*     (2006.01)
*F16B 17/00*   (2006.01)
*F21S 8/10*     (2006.01)

(52) U.S. Cl.
CPC ................ *B60Q 1/045* (2013.01); *F16B 17/00* (2013.01); *F21S 48/1208* (2013.01); *F21S 48/1216* (2013.01); *F21S 48/1233* (2013.01); *Y10T 29/49908* (2015.01); *Y10T 403/1616* (2015.01)

(58) Field of Classification Search
CPC ..... B60Q 1/0408; B60Q 1/04; F21S 48/1216; F21S 48/1208; F21S 48/1223; F21S 48/1266; F21S 48/1283; F21S 48/1291; F16B 17/002
USPC ................................. 362/522; 29/505; 403/13
See application file for complete search history.

(56) References Cited

U.S. PATENT DOCUMENTS

| 1,219,398 | A | 3/1917 | Huntsman |
| 1,261,036 | A | 4/1918 | Kerns |
| 1,301,302 | A | 4/1919 | Nolan |
| 1,556,233 | A | 10/1925 | Maise |
| 1,819,126 | A | 8/1931 | Scheibe |
| 1,929,848 | A | 10/1933 | Neely |

(Continued)

FOREIGN PATENT DOCUMENTS

| CN | 1036250 A | 10/1989 |
| CN | 1129162 A | 8/1996 |

(Continued)

OTHER PUBLICATIONS

U.S. Appl. No. 13/939,503, filed Jul. 11, 2013, entitled "Elastically Averaged Alignment Systems and Methods," inventor: Joel Colombo.

(Continued)

*Primary Examiner* — Anabel Ton
(74) *Attorney, Agent, or Firm* — Cantor Colburn LLP

(57) ABSTRACT

An elastically deformable flange locator arrangement includes a first component having a first engagement surface. Also included is a second component configured to be mated with the first component. Further included is a first portion of the second component. Yet further included is a second portion of the second component extending relatively perpendicularly from the first portion proximate a perimeter of the first portion, the second portion having a second engagement surface, wherein the second portion is configured to elastically deform at a first interface upon contact between the first engagement surface and the second engagement surface.

7 Claims, 5 Drawing Sheets

(56) References Cited

U.S. PATENT DOCUMENTS

| | | | |
|---|---|---|---|
| 1,968,168 A | 7/1934 | Place | |
| 1,982,076 A | 11/1934 | Spahn | |
| 2,006,525 A | 7/1935 | Thal | |
| 2,267,558 A | 12/1941 | Birger et al. | |
| 2,275,103 A * | 3/1942 | Gooch, Jr. et al. | 131/81.1 |
| 2,275,900 A | 3/1942 | Hall | |
| 2,482,488 A | 9/1949 | Franc | |
| 2,612,139 A | 9/1952 | Collins | |
| 2,688,894 A | 9/1954 | Modrey | |
| 2,707,607 A | 5/1955 | O'Connor | |
| 2,778,399 A | 1/1957 | Mroz | |
| 2,780,128 A | 2/1957 | Rapata | |
| 2,862,040 A | 11/1958 | Curran | |
| 2,902,902 A | 9/1959 | Slone | |
| 2,946,612 A | 7/1960 | Ahlgren | |
| 3,005,282 A | 10/1961 | Christiansen | |
| 3,014,563 A | 12/1961 | Bratton | |
| 3,087,352 A | 4/1963 | Daniel | |
| 3,089,269 A | 5/1963 | McKiernan | |
| 3,130,512 A | 4/1964 | Buren Jr. | |
| 3,152,376 A | 10/1964 | Boser | |
| 3,168,961 A | 2/1965 | Yates | |
| 3,169,004 A | 2/1965 | Rapata | |
| 3,169,439 A | 2/1965 | Rapata | |
| 3,188,731 A | 6/1965 | Sweeney | |
| 3,194,292 A | 7/1965 | Borowsky | |
| 3,213,189 A | 10/1965 | Mitchell et al. | |
| 3,230,592 A | 1/1966 | Hosea | |
| 3,233,358 A | 2/1966 | Dehm | |
| 3,233,503 A | 2/1966 | Birger | |
| 3,244,057 A | 4/1966 | Mathison | |
| 3,248,995 A | 5/1966 | Meyer | |
| 3,291,495 A | 12/1966 | Liebig | |
| 3,310,929 A | 3/1967 | Garvey | |
| 3,413,752 A | 12/1968 | Perry | |
| 3,473,283 A | 10/1969 | Meyer | |
| 3,531,850 A | 10/1970 | Durand | |
| 3,551,963 A | 1/1971 | Long | |
| 3,643,968 A | 2/1972 | Horvath | |
| 3,680,272 A | 8/1972 | Meyer | |
| 3,841,044 A | 10/1974 | Brown | |
| 3,842,565 A | 10/1974 | Brown et al. | |
| 3,845,961 A | 11/1974 | Byrd, III | |
| 3,847,492 A | 11/1974 | Kennicutt et al. | |
| 3,895,408 A | 7/1975 | Leingang | |
| 3,905,570 A | 9/1975 | Nieuwveld | |
| 3,972,550 A | 8/1976 | Boughton | |
| 4,035,874 A | 7/1977 | Liljendahl | |
| 4,039,215 A | 8/1977 | Minhinnick | |
| 4,042,307 A | 8/1977 | Jarvis | |
| 4,043,585 A | 8/1977 | Yamanaka | |
| 4,158,511 A | 6/1979 | Herbenar | |
| 4,169,297 A | 10/1979 | Weihrauch | |
| 4,213,675 A | 7/1980 | Pilhall | |
| 4,237,573 A | 12/1980 | Weihrauch | |
| 4,300,851 A | 11/1981 | Thelander | |
| 4,313,609 A | 2/1982 | Clements | |
| 4,318,208 A | 3/1982 | Borja | |
| 4,325,574 A | 4/1982 | Umemoto et al. | |
| 4,363,839 A | 12/1982 | Watanabe et al. | |
| 4,364,150 A | 12/1982 | Remington | |
| 4,384,803 A | 5/1983 | Cachia | |
| 4,394,853 A | 7/1983 | Lopez-Crevillen et al. | |
| 4,406,033 A | 9/1983 | Chisholm et al. | |
| 4,477,142 A | 10/1984 | Cooper | |
| 4,481,160 A | 11/1984 | Bree | |
| 4,575,060 A | 3/1986 | Kitagawa | |
| 4,605,575 A | 8/1986 | Auld et al. | |
| 4,616,951 A | 10/1986 | Maatela | |
| 4,648,649 A | 3/1987 | Beal | |
| 4,654,760 A * | 3/1987 | Matheson et al. | 362/546 |
| 4,745,656 A | 5/1988 | Revlett | |
| 4,767,647 A | 8/1988 | Bree | |
| 4,805,272 A | 2/1989 | Yamaguchi | |
| 4,807,335 A | 2/1989 | Candea | |
| 4,817,999 A | 4/1989 | Drew | |
| 4,819,983 A | 4/1989 | Alexander et al. | |
| 4,865,502 A | 9/1989 | Maresch | |
| 4,881,764 A | 11/1989 | Takahashi et al. | |
| 4,973,212 A | 11/1990 | Jacobs | |
| 4,977,648 A | 12/1990 | Eckerud | |
| 5,005,265 A | 4/1991 | Muller | |
| 5,039,267 A | 8/1991 | Wollar | |
| 5,139,285 A | 8/1992 | Lasinski | |
| 5,154,479 A | 10/1992 | Sautter, Jr. | |
| 5,180,219 A * | 1/1993 | Geddie | 362/546 |
| 5,208,507 A | 5/1993 | Jung | |
| 5,212,853 A | 5/1993 | Kaneko | |
| 5,234,122 A | 8/1993 | Cherng | |
| 5,297,322 A | 3/1994 | Kraus | |
| 5,339,491 A | 8/1994 | Sims | |
| 5,342,139 A | 8/1994 | Hoffman | |
| 5,368,797 A | 11/1994 | Quentin et al. | |
| 5,397,206 A | 3/1995 | Sihon | |
| 5,446,965 A | 9/1995 | Makridis | |
| 5,507,610 A | 4/1996 | Benedetti et al. | |
| 5,513,603 A | 5/1996 | Ang et al. | |
| 5,524,786 A | 6/1996 | Skudlarek | |
| 5,538,079 A | 7/1996 | Pawlick | |
| 5,556,808 A | 9/1996 | Williams et al. | |
| 5,575,601 A | 11/1996 | Skufca | |
| 5,577,301 A | 11/1996 | Demaagd | |
| 5,577,779 A | 11/1996 | Dangel | |
| 5,580,204 A | 12/1996 | Hultman | |
| 5,586,372 A | 12/1996 | Eguchi et al. | |
| 5,601,453 A | 2/1997 | Horchler | |
| 5,629,823 A | 5/1997 | Mizuta | |
| 5,634,757 A | 6/1997 | Schanz | |
| 5,657,516 A | 8/1997 | Berg et al. | |
| 5,667,271 A | 9/1997 | Booth | |
| 5,670,013 A | 9/1997 | Huang et al. | |
| 5,698,276 A | 12/1997 | Mirabitur | |
| 5,736,221 A | 4/1998 | Hardigg et al. | |
| 5,765,942 A * | 6/1998 | Shirai et al. | 362/267 |
| 5,775,860 A | 7/1998 | Meyer | |
| 5,795,118 A | 8/1998 | Osada et al. | |
| 5,797,170 A | 8/1998 | Akeno | |
| 5,803,646 A | 9/1998 | Weihrauch | |
| 5,806,915 A | 9/1998 | Takabatake | |
| 5,810,535 A | 9/1998 | Fleckenstein et al. | |
| 5,820,292 A | 10/1998 | Fremstad | |
| 5,846,631 A | 12/1998 | Nowosiadly | |
| 5,934,729 A | 8/1999 | Baack | |
| 5,941,673 A | 8/1999 | Hayakawa et al. | |
| 6,073,315 A | 6/2000 | Rasmussen | |
| 6,079,083 A | 6/2000 | Akashi | |
| 6,095,594 A | 8/2000 | Riddle et al. | |
| 6,164,603 A | 12/2000 | Kawai | |
| 6,193,430 B1 | 2/2001 | Culpepper et al. | |
| 6,199,248 B1 | 3/2001 | Akashi | |
| 6,202,962 B1 | 3/2001 | Snyder | |
| 6,209,175 B1 | 4/2001 | Gershenson | |
| 6,209,178 B1 | 4/2001 | Wiese et al. | |
| 6,264,869 B1 | 7/2001 | Notarpietro et al. | |
| 6,299,478 B1 | 10/2001 | Jones et al. | |
| 6,321,495 B1 | 11/2001 | Oami | |
| 6,349,904 B1 | 2/2002 | Polad | |
| 6,351,380 B1 | 2/2002 | Curlee | |
| 6,354,815 B1 | 3/2002 | Svihla et al. | |
| 6,398,449 B1 | 6/2002 | Loh | |
| 6,484,370 B2 | 11/2002 | Kanie et al. | |
| 6,485,241 B1 | 11/2002 | Oxford | |
| 6,523,817 B1 | 2/2003 | Landry, Jr. | |
| 6,533,391 B1 | 3/2003 | Pan | |
| 6,543,979 B2 | 4/2003 | Iwatsuki | |
| 6,557,260 B1 | 5/2003 | Morris | |
| 6,568,701 B1 | 5/2003 | Burdack et al. | |
| 6,579,397 B1 | 6/2003 | Spain et al. | |
| 6,591,801 B1 | 7/2003 | Fonville | |
| 6,609,717 B2 | 8/2003 | Hinson | |
| 6,658,698 B2 | 12/2003 | Chen | |
| 6,662,411 B2 | 12/2003 | Rubenstein | |
| 6,664,470 B2 | 12/2003 | Nagamoto | |
| 6,677,065 B2 | 1/2004 | Blauer | |

(56) References Cited

U.S. PATENT DOCUMENTS

| | | |
|---|---|---|
| 6,692,016 B2 | 2/2004 | Yokota |
| 6,712,329 B2 | 3/2004 | Ishigami et al. |
| 6,746,172 B2 | 6/2004 | Culpepper |
| 6,757,942 B2 | 7/2004 | Matsui |
| 6,799,758 B2 | 10/2004 | Fries |
| 6,840,969 B2 | 1/2005 | Kobayashi et al. |
| 6,857,676 B2 | 2/2005 | Kawaguchi et al. |
| 6,857,809 B2 | 2/2005 | Granata |
| 6,908,117 B1 | 6/2005 | Pickett, Jr. et al. |
| 6,932,416 B2 | 8/2005 | Clauson |
| 6,948,753 B2 | 9/2005 | Yoshida et al. |
| 6,951,349 B2 | 10/2005 | Yokota |
| 6,959,954 B2 | 11/2005 | Brandt et al. |
| 6,966,601 B2 | 11/2005 | Matsumoto et al. |
| 6,971,831 B2 | 12/2005 | Fattori et al. |
| 6,997,487 B2 | 2/2006 | Kitzis |
| 7,000,941 B2 | 2/2006 | Yokota |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,055,849 B2 | 6/2006 | Yokota |
| 7,059,628 B2 | 6/2006 | Yokota |
| 7,073,260 B2 | 7/2006 | Jensen |
| 7,089,998 B2 | 8/2006 | Crook |
| 7,097,198 B2 | 8/2006 | Yokota |
| 7,121,611 B2 | 10/2006 | Hirotani et al. |
| 7,144,183 B2 | 12/2006 | Lian et al. |
| 7,172,210 B2 | 2/2007 | Yokota |
| 7,178,855 B2 | 2/2007 | Catron et al. |
| 7,198,315 B2 | 4/2007 | Cass et al. |
| 7,234,852 B2 * | 6/2007 | Nishizawa et al. ........... 362/517 |
| 7,306,418 B2 | 12/2007 | Kornblum |
| 7,322,500 B2 | 1/2008 | Maierholzner |
| 7,344,056 B2 | 3/2008 | Shelmon et al. |
| 7,360,964 B2 | 4/2008 | Tsuya |
| 7,369,408 B2 | 5/2008 | Chang |
| 7,435,031 B2 | 10/2008 | Granata |
| 7,454,105 B2 | 11/2008 | Yi |
| 7,487,884 B2 | 2/2009 | Kim |
| 7,493,716 B2 | 2/2009 | Brown |
| 7,557,051 B2 | 7/2009 | Ryu et al. |
| 7,568,316 B2 | 8/2009 | Choby et al. |
| 7,591,573 B2 | 9/2009 | Maliar et al. |
| D602,349 S | 10/2009 | Andersson |
| 7,614,836 B2 | 11/2009 | Mohiuddin |
| 7,672,126 B2 | 3/2010 | Yeh |
| 7,677,650 B2 | 3/2010 | Huttenlocher |
| 7,764,853 B2 | 7/2010 | Yi et al. |
| 7,793,998 B2 | 9/2010 | Matsui et al. |
| 7,802,831 B2 | 9/2010 | Isayama et al. |
| 7,828,372 B2 | 11/2010 | Ellison |
| 7,862,272 B2 | 1/2011 | Nakajima |
| 7,869,003 B2 | 1/2011 | Van Doren et al. |
| 7,883,137 B2 | 2/2011 | Bar |
| 7,922,415 B2 | 4/2011 | Rudduck et al. |
| 7,946,684 B2 | 5/2011 | Drury et al. |
| 8,029,222 B2 | 10/2011 | Nitsche |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,203,496 B2 | 6/2012 | Miller et al. |
| 8,203,843 B2 | 6/2012 | Chen |
| 8,261,581 B2 | 9/2012 | Cerruti et al. |
| 8,276,961 B2 | 10/2012 | Kwolek |
| 8,297,137 B2 | 10/2012 | Dole |
| 8,297,661 B2 | 10/2012 | Proulx et al. |
| 8,414,048 B1 | 4/2013 | Kwolek |
| 8,444,199 B2 | 5/2013 | Takeuchi et al. |
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,826,499 B2 | 9/2014 | Tempesta |
| 8,833,832 B2 | 9/2014 | Whipps |
| 8,834,058 B2 | 9/2014 | Woicke |
| 9,039,318 B2 | 5/2015 | Mantei et al. |
| 9,050,690 B2 | 6/2015 | Hammer et al. |
| 9,061,715 B2 | 6/2015 | Morris |
| 9,067,625 B2 | 6/2015 | Morris |
| 2001/0030414 A1 | 10/2001 | Yokota |
| 2001/0045757 A1 | 11/2001 | Hideki et al. |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0136617 A1 | 9/2002 | Imahigashi |
| 2003/0007831 A1 | 1/2003 | Lian et al. |
| 2003/0080131 A1 | 5/2003 | Fukuo |
| 2003/0082986 A1 | 5/2003 | Wiens et al. |
| 2003/0087047 A1 | 5/2003 | Blauer |
| 2003/0108401 A1 | 6/2003 | Agha et al. |
| 2003/0180122 A1 | 9/2003 | Dobson |
| 2004/0037637 A1 | 2/2004 | Lian et al. |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2005/0016116 A1 | 1/2005 | Scherff |
| 2005/0031946 A1 | 2/2005 | Kruger et al. |
| 2005/0054229 A1 | 3/2005 | Tsuya |
| 2005/0082449 A1 | 4/2005 | Kawaguchi et al. |
| 2005/0156409 A1 | 7/2005 | Yokota |
| 2005/0156410 A1 | 7/2005 | Yokota |
| 2005/0156416 A1 | 7/2005 | Yokota |
| 2005/0244250 A1 | 11/2005 | Okada et al. |
| 2006/0092653 A1 | 5/2006 | Tachiiwa et al. |
| 2006/0102214 A1 | 5/2006 | Clemons |
| 2006/0110109 A1 | 5/2006 | Yu |
| 2006/0113755 A1 | 6/2006 | Yokota |
| 2006/0125286 A1 | 6/2006 | Horimatsu et al. |
| 2006/0141318 A1 | 6/2006 | MacKinnon et al. |
| 2006/0170242 A1 | 8/2006 | Forrester et al. |
| 2006/0197356 A1 | 9/2006 | Catron et al. |
| 2006/0202449 A1 | 9/2006 | Yokota |
| 2006/0237995 A1 | 10/2006 | Huttenlocher |
| 2006/0249520 A1 | 11/2006 | DeMonte |
| 2006/0264076 A1 | 11/2006 | Chen |
| 2007/0040411 A1 | 2/2007 | Dauvergne |
| 2007/0113483 A1 | 5/2007 | Hernandez |
| 2007/0113485 A1 | 5/2007 | Hernandez |
| 2007/0126211 A1 | 6/2007 | Moerke et al. |
| 2007/0144659 A1 | 6/2007 | De La Fuente |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0217796 A1 | 9/2008 | Van Bruggen et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0126168 A1 | 5/2009 | Kobe et al. |
| 2009/0134652 A1 | 5/2009 | Araki |
| 2009/0174207 A1 | 7/2009 | Lota |
| 2009/0265896 A1 | 10/2009 | Beak |
| 2009/0309388 A1 | 12/2009 | Ellison |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton et al. |
| 2010/0134128 A1 | 6/2010 | Hobbs |
| 2010/0147355 A1 | 6/2010 | Shimizu et al. |
| 2010/0247034 A1 | 9/2010 | Yi et al. |
| 2010/0270745 A1 | 10/2010 | Hurlbert et al. |
| 2011/0012378 A1 | 1/2011 | Ueno et al. |
| 2011/0036542 A1 | 2/2011 | Woicke |
| 2011/0076588 A1 | 3/2011 | Yamaura |
| 2011/0083392 A1 | 4/2011 | Timko |
| 2011/0119875 A1 | 5/2011 | Iwasaki |
| 2011/0131918 A1 | 6/2011 | Glynn |
| 2011/0175376 A1 | 7/2011 | Whitens et al. |
| 2011/0207024 A1 | 8/2011 | Bogumil et al. |

(56) References Cited

U.S. PATENT DOCUMENTS

| | | |
|---|---|---|
| 2011/0239418 A1 | 10/2011 | Huang |
| 2011/0296764 A1 | 12/2011 | Sawatani et al. |
| 2011/0311332 A1 | 12/2011 | Ishman |
| 2012/0020726 A1 | 1/2012 | Jan |
| 2012/0073094 A1 | 3/2012 | Bishop |
| 2012/0115010 A1 | 5/2012 | Smith et al. |
| 2012/0240363 A1 | 9/2012 | Lee |
| 2012/0251226 A1 | 10/2012 | Liu et al. |
| 2012/0261951 A1 | 10/2012 | Mildner et al. |
| 2012/0311829 A1 | 12/2012 | Dickinson |
| 2012/0321379 A1 | 12/2012 | Wang et al. |
| 2013/0019454 A1 | 1/2013 | Colombo et al. |
| 2013/0019455 A1 | 1/2013 | Morris |
| 2013/0027852 A1 | 1/2013 | Wang |
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1 | 2/2014 | Morris et al. |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |
| 2014/0132023 A1 | 5/2014 | Watanabe |
| 2014/0175774 A1 | 6/2014 | Kansteiner |
| 2014/0202628 A1 | 7/2014 | Sreetharan et al. |
| 2014/0208561 A1 | 7/2014 | Colombo et al. |
| 2014/0208572 A1 | 7/2014 | Colombo et al. |
| 2014/0220267 A1 | 8/2014 | Morris et al. |
| 2014/0298638 A1 | 10/2014 | Colombo et al. |
| 2014/0298640 A1 | 10/2014 | Morris et al. |
| 2014/0298962 A1 | 10/2014 | Morris et al. |
| 2014/0301777 A1 | 10/2014 | Morris et al. |
| 2015/0016918 A1 | 1/2015 | Colombo |
| 2015/0050068 A1 | 2/2015 | Morris et al. |
| 2015/0165609 A1 | 6/2015 | Morris et al. |

FOREIGN PATENT DOCUMENTS

| | | |
|---|---|---|
| CN | 1205285 A | 1/1999 |
| CN | 1328521 A | 12/2001 |
| CN | 1426872 A | 7/2003 |
| CN | 2661972 Y | 12/2004 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |
| CN | 2888807 Y | 4/2007 |
| CN | 1961157 A | 5/2007 |
| CN | 2915389 Y | 6/2007 |
| CN | 101250964 A | 4/2008 |
| CN | 201259846 Y | 6/2009 |
| CN | 201268336 Y | 7/2009 |
| CN | 201310827 Y | 9/2009 |
| CN | 201540513 U | 8/2010 |
| CN | 101821534 | 9/2010 |
| CN | 201703439 U | 1/2011 |
| CN | 201737062 U | 2/2011 |
| CN | 201792722 U | 4/2011 |
| CN | 201890285 U | 7/2011 |
| CN | 102144102 A | 8/2011 |
| CN | 102235402 A | 11/2011 |
| CN | 202079532 U | 12/2011 |
| CN | 102313952 A | 1/2012 |
| CN | 102756633 | 10/2012 |
| CN | 102803753 A | 11/2012 |
| CN | 102869891 A | 1/2013 |
| CN | 202686206 U | 1/2013 |
| CN | 102939022 A | 2/2013 |
| CN | 103201525 A | 7/2013 |
| DE | 1220673 B | 7/1966 |
| DE | 2736012 A1 | 2/1978 |
| DE | 3704190 A1 | 12/1987 |
| DE | 3711696 A1 | 10/1988 |
| DE | 3805693 A1 | 2/1989 |
| DE | 3815927 | 11/1989 |
| DE | 4002443 A1 | 8/1991 |
| DE | 4111245 A1 | 10/1991 |
| DE | 29714892 U1 | 10/1997 |
| DE | 29800379 U1 | 5/1998 |
| DE | 69600357 T2 | 12/1998 |
| DE | 10234253 B3 | 4/2004 |
| DE | 102008005618 A1 | 7/2009 |
| DE | 102010028323 A1 | 11/2011 |
| DE | 102011050003 A1 | 10/2012 |
| DE | 102012212101 B3 | 7/2013 |
| EP | 0118796 | 9/1984 |
| EP | 1132263 A1 | 9/2001 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| FR | 2750177 A2 | 12/1997 |
| FR | 2958696 A1 | 10/2011 |
| GB | 2281950 A | 3/1995 |
| JP | 2001141154 A | 5/2001 |
| JP | 2001171554 A | 6/2001 |
| JP | 2005268004 | 9/2005 |
| JP | 2006205918 | 8/2006 |
| JP | 2008307938 A | 12/2008 |
| JP | 2009084844 | 4/2009 |
| JP | 2009187789 A | 8/2009 |
| JP | 2011085174 A | 4/2011 |
| KR | 20030000251 A1 | 1/2003 |
| WO | 2008140659 A1 | 11/2008 |
| WO | 2010105354 A1 | 9/2010 |
| WO | 2013191622 A1 | 12/2013 |

OTHER PUBLICATIONS

U.S. Appl. No. 13/940,912, filed Jul. 12, 2013, entitled "Alignment Arrangement for Mated Components and Method", inventors: Steven E. Morris and Jennifer P. Lawall.

U.S. Appl. No. 13/945,231, filed Jul. 18, 2013, entitled "Lobular Elastic Tube Alignment System for Providing Precise Four-Way Alignment of Components", Inventors: Steven E. Morris and Jennifer P. Lawall.

U.S. Appl. No. 13/954,198, filed Jul. 30, 2013, entitled "Elastic Alignment and Retention System and Method," inventors: Steven E. Morris, Edward D. Groninger, and Raymond J. Chess.

U.S. Appl. No. 13/966,523, filed Aug. 14, 2013, entitled "Elastically Averaged Alignment Systems and Methods Thereof," inventors: Steven E. Morris, Jennifer P. Lawall and Joel Colombo.

U.S. Appl. No. 13/973,587, filed Aug. 22, 2013, entitled "Elastic Averaging Alignment System and Method," inventors: Steven E. Morris and Jennifer P. Lawall.

U.S. Appl. No. 13/974,729, filed Aug. 23, 2013, entitled "Elastic Averaging Snap Member Aligning and Fastening System", inventors: Steven E. Morris and Jennifer P. Lawall.

U.S. Appl. No. 14/012,205, filed Aug. 28, 2013, entitled "Elastically Deformable Alignment Fastener and System," inventors: Steven E. Morris, Marc J. Tahnoose, Michael E. McGuire and Jennifer P. Lawall.

U.S. Appl. No. 14/021,282, filed Sep. 9, 2013, entitled "Elastic Tube Alignment and Fastening System for Providing Precise Alignment and Fastening of Components," inventors: Steven E. Morris and Jennifer P. Lawall.

U.S. Appl. No. 14/031,647, filed Sep. 19, 2013, entitled "Elastically Averaged Alignment Systems and Methods," inventors: Steven E. Morris, Joel Colombo, Jennifer P. Lawall, Jeffrey L. Konchan, and Steve J. Briggs.

(56) References Cited

OTHER PUBLICATIONS

U.S. Appl. No. 14/038,241, filed Sep. 26, 2013, entitled "Serviceable Aligning and Self-Retaining Elastic Arrangement for Mated Components and Method," inventors: Steven E. Morris, Jennifer P. Lawall and Joel Colombo.
U.S. Appl. No. 14/039,614, filed Sep. 27, 2013, entitled "Elastically Averaged Alignment Systems and Methods," inventor: Steven E. Morris.
U.S. Appl. No. 14/044,199, filed Oct. 2, 2013, entitled "Lobular Elastic Tube Alignment and Retention System for Providing Precise Alignment of Components," inventors: Steven E. Morris and Jennifer P. Lawall.
U.S. Appl. No. 14/044,207, filed Oct. 2, 2013, entitled "Elastic Aperture Alignment System for Providing Precise Four-Way Alignment of Components," inventors: Steven E. Morris and Jennifer P. Lawall.
U.S. Appl. No. 14/045,463, filed Oct. 3, 2013, entitled "Elastically Averaged Alignment Systems and Methods," inventors: Steven E. Morris and Jennifer P. Lawall.
U.S. Appl. No. 14/081,361, filed Nov. 15, 2013, entitled "Elastically Deformable Clip and Method," inventors: Steven E. Morris, Jennifer P. Lawall and Jeffrey M. Gace.
U.S. Appl. No. 14/104,321, filed Dec. 12, 2013, entitled "Alignment and Retention System for a Flexible Assembly," inventors: Steven E. Morris and Jennifer P. Lawall.
U.S. Appl. No. 14/104,327, filed Dec. 12, 2013, entitled "Self-Retaining Alignment System for Providing Precise Alignment and Retention of Components," inventors: Steven E. Morris, Jennifer P. Lawall and Toure D. Lee.
U.S. Appl. No. 14/104,333, filed Dec. 12, 2013, entitled "Alignment System for Providing Precise Alignment and Retention of Components of a Sealable Compartment," inventors: Steven E. Morris, Christopher J. Georgi, Jennifer P. Lawall and Gordan N. Noll.
U.S. Appl. No. 14/104,541, filed Dec. 12, 2013, entitled "Alignment and Retention System for Providing Precise Alignment and Retention of Components," inventors: Steven E. Morris and Jennifer P. Lawall.
U.S. Appl. No. 14/104,549, filed Dec. 12, 2013, entitled "Alignment System for Providing Alignment of Components Having Contoured Features," inventors: Steven E. Morris and Jennifer P. Lawall.
U.S. Appl. No. 14/108,921, filed Dec. 17, 2013, entitled "Elastically Averaged Alignment Systems and Methods Thereof," inventors: Steven E. Morris and Jennifer P. Lawall.
U.S. Appl. No. 14/108,931, filed Dec. 17, 2013, entitled "Elastically Averaged Strap Systems and Methods," inventors: Steven E. Morris and Jennifer P. Lawall.
U.S. Appl. No. 14/109,296, filed Dec. 17, 2013, entitled "Fastener for Operatively Coupling Matable Components," inventors: Steven E. Morris and Jennifer P. Lawall.
U.S. Appl. No. 14/134,622, filed Dec. 19, 2013, entitled "Elastic Averaging Alignment Member," inventors: Steven E. Morris and Jennifer P. Lawall.
U.S. Appl. No. 14/134,801, filed Dec. 19, 2013, entitled "Elastically Averaged Alignment Systems and Methods," inventors: Steven E. Morris and Jennifer P. Lawall.
U.S. Appl. No. 14/134,844, filed Dec. 19, 2013, entitled "Elastically Deformable Module Installation Assembly," inventors: Steven E. Morris and Jennifer P. Lawall.
U.S. Appl. No. 14/134,888, filed Dec. 19, 2013, entitled "Elastic Retaining Assembly and Method," inventors: Steven E. Morris and Jennifer P. Lawall.
U.S. Appl. No. 14/136,502, filed Dec. 20, 2013, entitled "Elastically Averaged Alignment Systems and Methods," inventors: Timothy A. Kiester, Steven E. Morris, Kenton L. West, Scott J. Fast, and Evan Phillips.
U.S. Appl. No. 14/151,279, filed Jan. 9, 2014, entitled "Elastically Averaged Alignment Systems and Methods," inventors: Steven E. Morris and Jennifer P. Lawall.
U.S. Appl. No. 14/153,741, filed Jan. 13, 2014, entitled "Elastically Averaged Assembly for Closure Applications," inventors: Steven E. Morris, Jeffrey A. Abell, Jennifer P. Lawall, and Jeffrey L. Konchan.
U.S. Appl. No. 14/180,882, filed on Feb. 14, 2014, entitled "Elastic Tube Alignment System for Precisely Locating Components," inventor: Steven E. Morris.
U.S. Appl. No. 14/181,142, filed Feb. 14, 2014, entitled "Elastic Tube Alignment System for Precisely Locating Components," inventor: Steven E. Morris.
U.S. Appl. No. 14/185,422, filed Feb. 20, 2014, entitled "Elastically Averaged Alignment Systems and Methods," inventors: Joel Colombo, Steven E. Morris, Jennifer P. Lawall and Ashish M. Gollapalli.
U.S. Appl. No. 14/185,472, filed Feb. 20, 2014, entitled "Elastically Averaged Alignment Systems and Method," inventors: Steven E. Morris, Jennifer P. Lawall and Kee Hyuk Im.
U.S. Appl. No. 14/231,395, filed Mar. 31, 2014, entitled "Elastically Averaged Alignment Systems and Methods," inventors: Joel Colombo, Steven E. Morris, Jennifer P. Lawall, and Ashish M. Gollapalli.
U.S. Appl. No. 14/249,746, filed Apr. 10, 2014, entitled "Elastically Averaged Alignment Systems and Methods," inventors: Joel Colombo and Catherine A. Ostrander.
U.S. Appl. No. 14/259,747, filed Apr. 23, 2014, entitled "System for Elastically Averaging Assembly of Components," inventors: Steven E. Morris and Jennifer P. Lawall.
Cross-sectional view of a prior art infrared welded assembly of BMW, Munich, Germany. Believed on the market since about Jan. 1, 2010.
"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.
"Elastic Averaging in Flexure Mechanisms: A Multi-Beam Paralleaogram Flexture Case-Study" by Shorya Awtar and Edip Sevincer, Proceedings of IDETC/CIE 2006, Paper DETC2006-99752, American Society of Mechanical Engineers (ASME), Sep. 2006.
"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.
"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.
"Passive Alignment of Micro-Fluidic Chips Using the Principle of Elastic Averaging" by Sitanshu Gurung, Thesis, Louisiana State University, Dept. of Mechanical Engineering, Dec. 2007.
"Precision Connector Assembly Using Elastic Averaging" by Patrick J. Willoughby and Alexander H. Slocum, Massachusetts Institute of Technology (MIT), Cambridge, MA, American Society for Precision Engineering, 2004.
U.S. Appl. No. 13/229,926, filed Sep. 12, 2011, entitled "Using Elastic Averaging for Alignment of Battery Stack, Fuel Cell Stack, or Other Vehicle Assembly", inventors: Mark A. Smith, Ronald Daul, Xiang Zhao, David Okonski, Elmer Santos, Lane Lindstrom, and Jeffrey A. Abell.
U.S. Appl. No. 13/330,718, filed Dec. 20, 2011, entitled "Precisely Locating Components in an Infrared Welded Assembly", inventor: Steven E. Morris.
U.S. Appl. No. 13/459,118, filed Apr. 28, 2012, entitled "Stiffened Multi-Layer Compartment Door Assembly Utilizing Elastic Averaging," inventor: Steven E. Morris.
U.S. Appl. No. 13/567,580, filed Aug. 6, 2012, entitled "Semi-Circular Alignment Features of an Elastic Averaging Alignment System", inventors: Steven E. Morris and Thomas F. Bowles.
U.S. Appl. No. 13/570,959, filed Aug. 9, 2012, entitled "Elastic Cantilever Beam Alignment System for Precisely Aligning Components", inventor: Steven E. Morris.
U.S. Appl. No. 13/571,030, filed Aug. 9, 2012, entitled "Elastic Tube Alignment System for Precisely Locating an Emblem Lens to an Outer Bezel", inventors: Joel Colombo, Steven E. Morris, and Michael D. Richardson.
U.S. Appl. No. 13/752,449, filed Jan. 29, 2013, entitled "Elastic Insert Alignment Assembly and Method of Reducing Positional Variation", inventors: Steven E. Morris and Michael D. Richardson.

(56) References Cited

OTHER PUBLICATIONS

U.S. Appl. No. 13/755,759, filed Jan. 31, 2013, entitled "Elastic Alignment Assembly for Aligning Mated Components and Method of Reducing Positional Variation", inventors: Joel Colombo, Michael D. Richardson, and Steven E. Morris.

U.S. Appl. No. 13/851,222, filed Mar. 27, 2013, entitled "Elastically Averaged Alignment System", inventors: Joel Colombo and Steven E. Morris.

U.S. Appl. No. 13/855,928, filed Apr. 3, 2013, entitled "Elastic Averaging Alignment System, Method of Making the Same and Cutting Punch Therefor", inventors: Steven E. Morris, Jennifer P. Lawall, Joel Colombo, and Jeffrey L. Konchan.

U.S. Appl. No. 13/856,888, filed Apr. 4, 2013, entitled "Elastic Retaining Assembly for Matable Components and Method of Assembling", inventors: Steven E. Morris, Jennifer P. Lawall, Joel Colombo, and Toure D. Lee.

U.S. Appl. No. 13/856,927, filed Apr. 4, 2013, entitled "Elastic Tubular Attachment Assembly for Mating Components and Method of Mating Components", inventors: Steven E. Morris and Jennifer P. Lawall.

U.S. Appl. No. 13/856,956, filed Apr. 4, 2013, entitled "Elastic Clip Retaining Arrangement and Method of Mating Structures with an Elastic Clip Retaining Arrangement", inventors: Joel Colombo, Steven E. Morris and Jeffrey L. Konchan.

U.S. Appl. No. 13/856,973, filed Apr. 4, 2013, entitled "Elastically Deformable Flange Locator Arrangement and Method of Reducing Positional Variation", inventors: Joel Colombo, Steven E. Morris and Michael D. Richardson.

U.S. Appl. No. 13/858,478, filed Apr. 8, 2013, entitled "Elastic Mating Assembly and Method of Elastically Assembling Matable Components", inventors: Steven E. Morris and Jennifer P. Lawall.

U.S. Appl. No. 13/859,109, filed Apr. 9, 2013, entitled "Elastic Retaining Arrangement for Jointed Components and Method of Reducing a Gap Between Jointed Components," inventors: Steven E. Morris, James M. Kushner, Victoria L. Enyedy, Jennifer P. Lawall, and Piotr J. Ogonek.

U.S. Appl. No. 13/915,132, filed Jun. 11, 2013, entitled "Elastically Deformable Energy Management Arrangement and Method of Managing Energy Absorption," inventors: Steven E. Morris, Randy A. Johnson and Jennifer P. Lawall.

U.S. Appl. No. 13/915,177, filed Jun. 11, 2013, entitled "Elastically Deformable Energy Management Assembly and Method of Managing Energy Absorption," inventors: Steven E. Morris, Jennifer P. Lawall, and Randy Johnson.

U.S. Appl. No. 13/917,005, filed Jun. 13, 2013, entitled "Elastic Attachment Assembly and Method of Reducing Positional Variation and Increasing Stiffness," inventors: Steven E. Morris and Jennifer P. Lawall.

U.S. Appl. No. 13/917,074, filed Jun. 13, 2013, entitled "Elastically Deformable Retaining Hook for Components to be Mated Together and Method of Assembling", inventors: Joel Colombo, Jeffrey L. Konchan, Steven E. Morris, and Steve J. Briggs.

U.S. Appl. No. 13/918,183, filed Jun. 14, 2013, entitled "Elastic Retaining Assembly for Matable Components and Method of Assembling," inventors: Steven E. Morris and Jennifer P. Lawall.

* cited by examiner

ELASTICALLY DEFORMABLE FLANGE LOCATOR ARRANGEMENT AND METHOD OF REDUCING POSITIONAL VARIATION

FIELD OF THE INVENTION

The present invention relates to an elastically deformable flange locator arrangement for aligning components relative to each other, as well as a method of reducing positional variation for components of the elastically deformable flange locator arrangement.

BACKGROUND

Currently, components which are to be mated together in a manufacturing process are subject to positional variation based on the mating arrangements used to assemble the components. One common arrangement includes components mutually located with respect to each other by 2-way and/or 4-way male alignment features, typically upstanding bosses, which are received into corresponding female alignment features, typically apertures in the form of openings and/or slots. Alternatively, adhesives or welding processes may be employed to mate parts. Regardless of the precise mating arrangement, a clearance typically exists between at least a portion of the mated components, which is predetermined to match anticipated size and positional variation tolerances of the mating features as a result of manufacturing (or fabrication) variances. As a result, the occurrence of significant positional variation between the mated components, which contributes to the presence of undesirably large and varying gaps and otherwise poor fit may occur.

SUMMARY OF THE INVENTION

In one exemplary embodiment, an elastically deformable flange locator arrangement includes a first component having a first engagement surface. Also included is a second component configured to be mated with the first component. Further included is a first portion of the second component. Yet further included is a second portion of the second component extending relatively perpendicularly from the first portion proximate a perimeter of the first portion, the second portion having a second engagement surface, wherein the second portion is configured to elastically deform at a first interface upon contact between the first engagement surface and the second engagement surface.

In another exemplary embodiment, an automotive lighting assembly includes an automotive lighting housing. Also included is a channel formed and extending proximate a housing perimeter of the automotive lighting housing, the channel comprising a first channel engagement surface and a second channel engagement surface. Further included is a lens configured to be mated with the automotive lighting housing. Yet further included is a first portion of the lens. Also included is a second portion and a third portion of the lens, each extending relatively perpendicularly from the first portion proximate a lens perimeter, the second portion having a first lens engagement surface and the third portion having a second lens engagement surface, wherein at least one of the first lens engagement surface and the second lens engagement surface is configured to elastically deform upon contact with the channel of the automotive lighting housing.

In yet another exemplary embodiment, a method of reducing positional variation of mated components is provided. The method includes forming a first engagement surface in a first component. The method also includes contacting a second engagement surface located proximate a perimeter of a second component with the first engagement surface, wherein the second component comprises a first portion and a second portion, the second portion extending relatively perpendicularly from the first portion, wherein the second portion comprises the second engagement surface. The method further includes elastically deforming second portion of the second component upon contacting the second engagement surface with the first engagement surface. The method yet further includes performing an elastic averaging of the elastic deformation over the second engagement surface, wherein upon reaching a fully engaged position of the second portion of the second component a fitted alignment between the first component and the second component is established.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
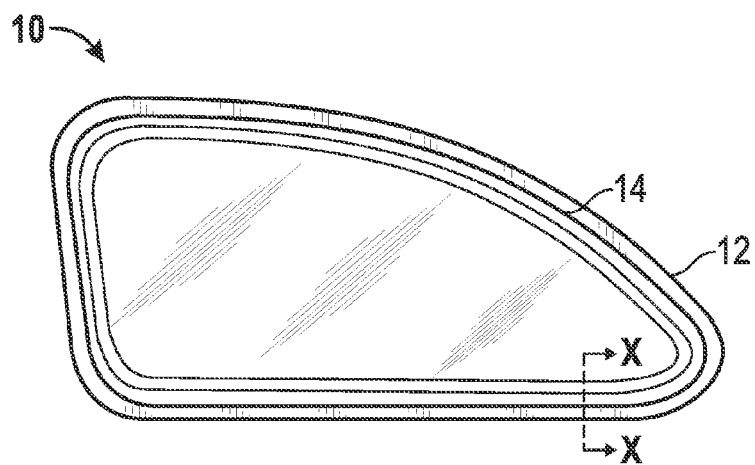
FIG. 1 is a front, elevational view of an elastically deformable flange locator arrangement.
Figure 2:
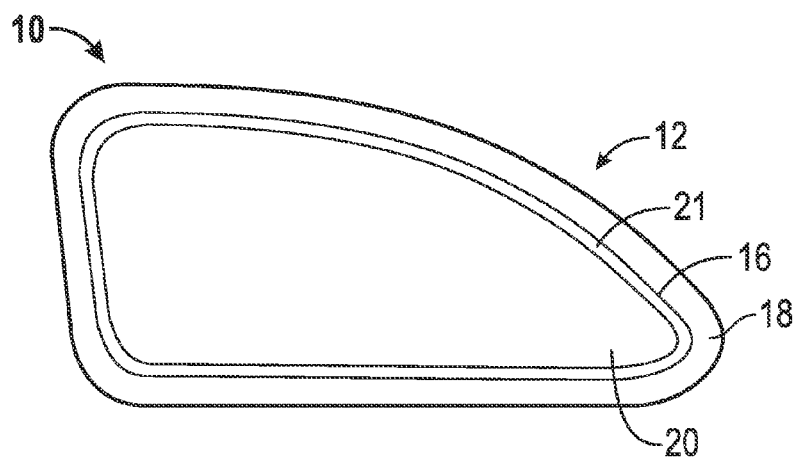
FIG. 2 is a front, elevational view of a first component of the elastically deformable flange locator arrangement of FIG. 1.
Figure 3:
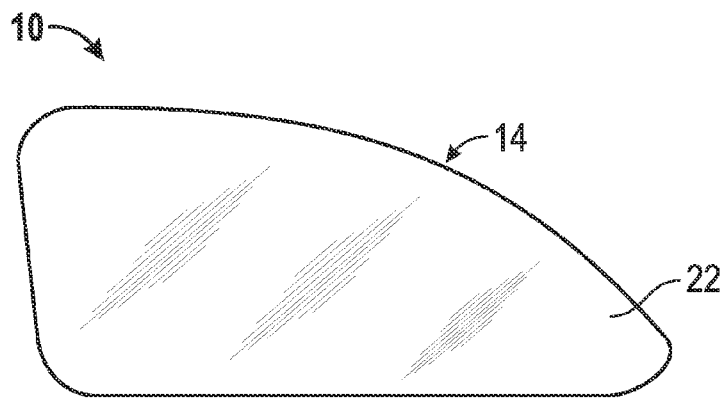
FIG. 3 is a front, elevational view of a second component of the elastically deformable flange locator arrangement of FIG. 1.

Referring to FIGS. 1-3, an elastically deformable flange locator arrangement 10 is generally illustrated. The elastically deformable flange locator arrangement comprises matable components, such as a first component 12 and a second component 14 that, when assembled, are disposed in a mated configuration with respect to each other. In one embodiment, the elastically deformable flange locator arrangement 10 is employed in a vehicle application, such as a lighting assembly that may include a headlamp or tail lamp assembly. However, it is to be understood that the components may be associated with numerous other applications and industries, such as home appliance and aerospace applications, for example. In an exemplary embodiment such as a lighting assembly for an automobile, the first component 12 comprises a housing operatively coupled to the vehicle and configured to receive the second component 14, which is a lens component.

Although illustrated in a specific geometry, the first component 12 and the second component 14 may be configured in countless geometries. Regardless of the precise geometry of the first component 12 and the second component 14, the second component 14 is configured to align with and fittingly mate with the first component 12, which will be described in detail below. In an alternative embodiment, rather than two components comprising the elastically deformable flange locator arrangement 10, additional layers or components may be included. It is to be appreciated that the elastically deformable flange locator arrangement 10 is to be employed for providing a self-aligning relationship between components, such as the first component 12 and the second component 14, while also assisting in securely mating the components to each other.

Figure 4:
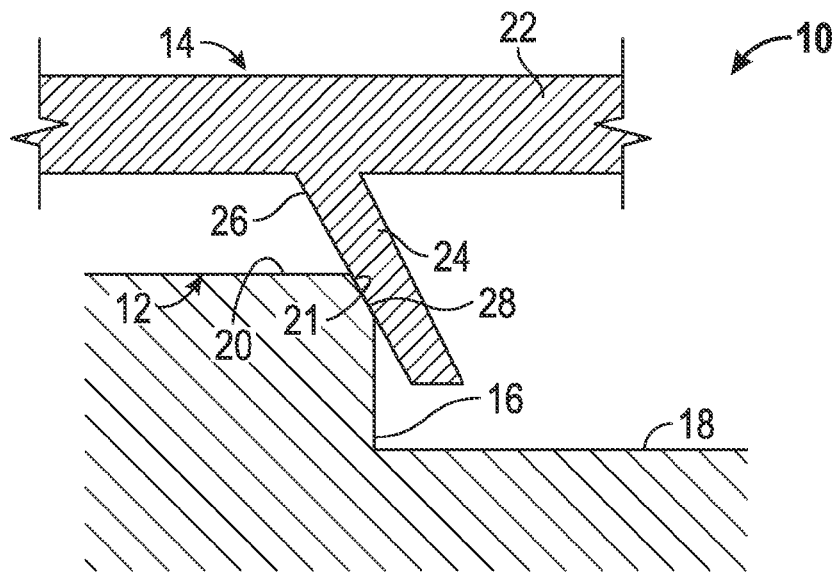
FIG. 4 is a cross-sectional view, taken along line X-X of FIG. 1 of the elastically deformable flange locator arrangement according to a first embodiment.

Referring now to FIG. 4, a first embodiment of the elastically deformable flange locator arrangement 10 is illustrated in greater detail. Specifically, a cross-sectional view is shown to illustrate an engagement region between the first component 12 and the second component 14 of the elastically deformable flange locator arrangement 10. In the illustrated embodiment, the first component 12 includes a first engagement surface 16 that extends in a peripheral manner around the first component 12. In one embodiment, the first engagement surface 16 extends continuously around a portion of the first component 12, typically proximate a perimeter of the first component 12, but the first engagement surface 16 may be disposed inwardly at various contemplated distances, depending on the particular application. The first engagement surface 16 comprises a first engagement surface length, also referred to herein as a first perimeter. In the illustrated embodiment, the first engagement surface 16 is disposed proximate a region of the first component 12 that "falls off" in a semi-trough like manner. In particular, the first engagement surface 16 extends between and connects a base wall 18 and an elevated wall 20 of the first component 12. As illustrated, the first engagement surface 16 is typically a substantially planar surface and may be aligned at a substantially perpendicular angle relative to the base wall 18 and the elevated wall 20, as shown. Although illustrated and described above as having a substantially planar surface, it is contemplated that a slight degree of curvature may be included in at least a portion of the first engagement surface 16.

The second component 14 includes a first portion 22 and a second portion 24. The first portion 22 comprises a main portion of the second component 14 that is to be mated with the first component 12. The first portion 22 may be substantially planar or curvilinear and is aligned relatively parallel to the base wall 18 and the elevated wall 20 of the first component 12. The second portion 24 extends relatively non-perpendicularly from the first portion 22 toward the first component 12 and includes a second engagement surface 26. The second portion 24 is typically disposed proximate a perimeter of the first portion 22 of the second component 14, but may be disposed inwardly from the perimeter. Ultimately, the location of the second portion 24 is determined by the location of the first engagement surface 16 of the first component 12. Specifically, the first engagement surface 16 and the second engagement surface 26 are aligned to contact each other upon mating of the first component 12 and the second component 14.

Similar to the first engagement surface 16, the second engagement surface 26 extends in a peripheral manner around the first portion 22 of the second component 14, as well as continuously around a portion of the second component 14. The second engagement surface 26 comprises a second engagement surface length, also referred to herein as a second perimeter. The second perimeter is less than the first perimeter described above, such that the second engagement surface 26 is disposed radially inwardly of the first engagement surface 16. More particularly, the second engagement surface 26 is positioned to ensure contact between the surfaces, with such a contact region comprising a first interface region 28. The second portion 24 is positioned and engaged with the first engagement surface 16 of the first component 12 upon translation of the second component 14 toward the base wall 18. The second engagement surface 26 engages the first engagement surface 16 at a position spaced from the base wall 18. Subsequent translation of the second portion 24 toward the base wall 18 results in an elastic deformation of the second portion 24 at the first interface region 28. Furthermore, as shown, the first engagement surface 16 includes a chamfer portion 21 disposed at a distal end from the base wall 18. The chamfer portion 21 comprises a beveled surface and is configured to provide a "lead-in" region for the second engagement surface 26. Numerous angles of the chamfer portion 21 are contemplated. In addition to the "lead-in" benefit provided by the chamfer portion 21, the angled surface enhances a contact interference condition between the first component 12 and the second component 14 by increasing the compressive surface area that is available to impart a compressive force on the second engagement surface 26.

Any suitable elastically deformable material may be used for the second component 24. More specifically, elastically deformable material is disposed proximate, or integral to, the second engagement surface 26 of the second component 24. The term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Numerous examples of materials that may at least partially form the components include various metals, polymers, ceramics, inorganic materials or glasses, or composites of any of the aforementioned materials, or any other combinations thereof Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS), such as an ABS acrylic. The material may be in any form and formed or manufactured by any suitable process, including stamped or formed metal, composite or other sheets, forgings, extruded parts, pressed parts, castings, or molded parts and the like, to include the deformable features described herein. The material, or materials, may be selected to provide a predetermined elastic response characteristic of the second portion 24. The predetermined elastic response characteristic may include, for example, a predetermined elastic modulus.

The precise position where engagement between the first engagement surface 16 and the second engagement surface 26 occurs will vary depending on positional variance imposed by manufacturing factors. Due to the elastically deformable properties of the elastic material comprising the second portion 24, the criticality of the initial location of engagement is reduced. Further insertion of the second portion 24 along the first engagement surface 16 toward the base wall 18 ultimately leads to a fully engaged position of the second portion 24, and more particularly the second component 14. It is contemplated that the second portion 24 may engage the base wall 18 of the first component 12 or may not contact the base wall 18. The dimensions of the second portion 24 and the first engagement surface 16, as well as the elastic properties of the elastic material(s), ultimately dictate the fully engaged position. In the fully engaged position, the second portion 24 is in contact with the first engagement surface 16 along an entirety of the second engagement surface 26.

Irrespective of the precise location of the fully engaged position, fitted engagement between the first engagement surface 16 and the second engagement surface 26 is achieved by elastically averaging the deformation along the first interface region 28, thereby positioning the second component 14 to the first component 12. Regardless of whether the first component 12 and the second component 14 are retained merely by engagement between the first engagement surface 16 and the second engagement surface 26 or in conjunction with additional retaining features, the elastic deformation of the second portion 24 elastically averages any positional errors of the first component 12 and the second component 14. In other words, gaps that would otherwise be present due to positional errors associated with portions or segments of the first component 12 and the second component 14, particularly locating and retaining features, are eliminated by offsetting the gaps with an over-constrained condition along other portions or segments of the first engagement surface 16 and the second engagement surface 26. Such errors are accounted for by averaging deformation of the second portion 24 over the second engagement surface 26.

Elastic averaging provides elastic deformation of the interface(s) between mated components, wherein the average deformation provides a precise alignment, the manufacturing positional variance being minimized to $X_{min}$, defined by, $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187,675, the disclosure of which is incorporated by reference herein in its entirety. The embodiments disclosed above provide the ability to convert an existing component that is not compatible with the above-described elastic averaging principles to an assembly that does facilitate elastic averaging and the benefits associated therewith.

Figure 5:
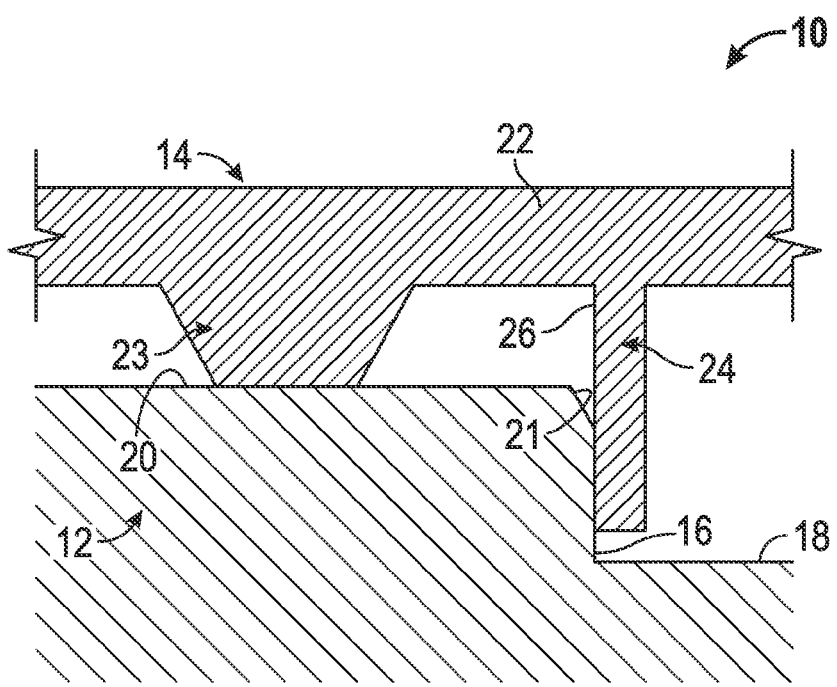
FIG. 5 is a cross-sectional view, taken along line X-X of FIG. 1 of the elastically deformable flange locator arrangement according to a second embodiment.

Referring to FIG. 5, a second embodiment of the elastically deformable flange locator arrangement 10 is illustrated. The components of the second embodiment are similar in many respects to those described above in conjunction with the first embodiment, with the second portion 24 of the second component 14 aligned in a substantially orthogonal relationship with the first portion 22 of the second component 14. The first component 12 also includes the chamfer portion 21 for lead-in purposes, but the second engagement surface 26 of the second portion 24 primarily engages the first engagement surface 16 along a portion of the first engagement surface 16 that is similarly aligned in a substantially orthogonal manner to the base wall 18. The second embodiment also includes a locator component 23 that is configured to limit the depth of insertion of the second component 14 toward the base wall 18 of the first component 12. As shown, insertion is halted upon contact between the locator component 23 and the elevated wall 20 of the first component 12.

Figure 6:
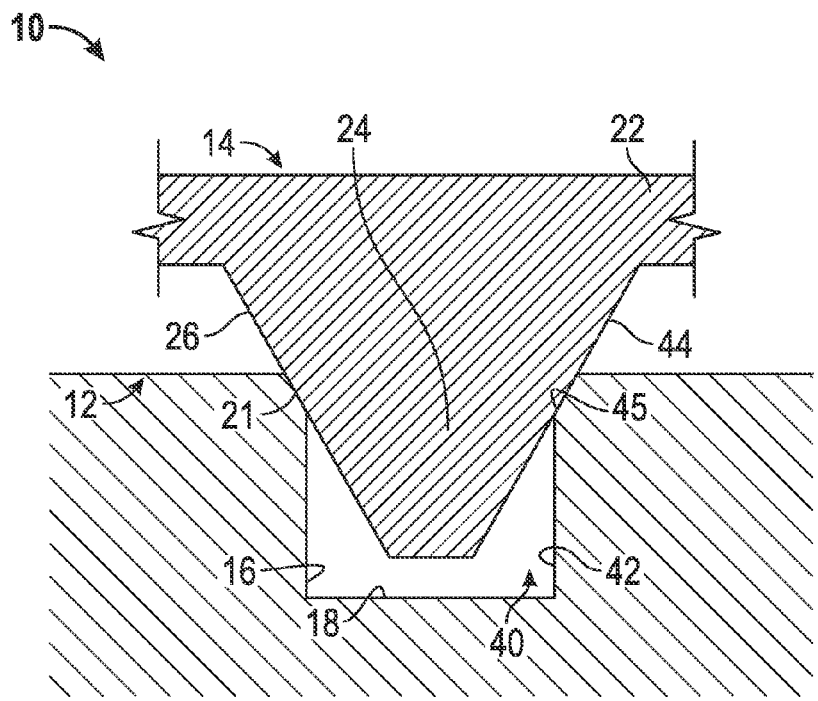
FIG. 6 is a cross-sectional view, taken along line X-X of FIG. 1 of the elastically deformable flange locator arrangement according to a third embodiment.

Referring now to FIG. 6, a third embodiment of the elastically deformable flange locator arrangement 10 is illustrated in greater detail. The third embodiment is similar in many respects to the first embodiments, such that duplicative description of the previously described components and features is not necessary. Furthermore, identical reference numerals are employed for previously described elements where appropriate.

Rather than the semi-trough like "fall off" portion of the first component 12 of the first embodiments, the third embodiment includes a channel 40. The channel 40 includes the first engagement surface 16, also referred to as a first channel engagement surface, the base wall 18 and a second channel engagement surface 42. In addition to engagement between the first engagement surface 16 and the second engagement surface 26, the second portion 24 of the second component 14 includes an additional engagement surface 44 configured to contact the second channel engagement surface 42. The distance between the second engagement surface 26 and the additional engagement surface 44 may be referred to as a second portion width. The second portion width is greater than the width of the channel 40, such that contact between the second portion 24 and the channel 40 is ensured proximate at least one of the interfaces. As with the first engagement surface 16, the second channel engagement surface 42 includes an additional chamfer portion 45 for engaging with and compressing the additional engagement surface 44. The structure and function of the chamfer portions is described in detail above.

Figure 7:
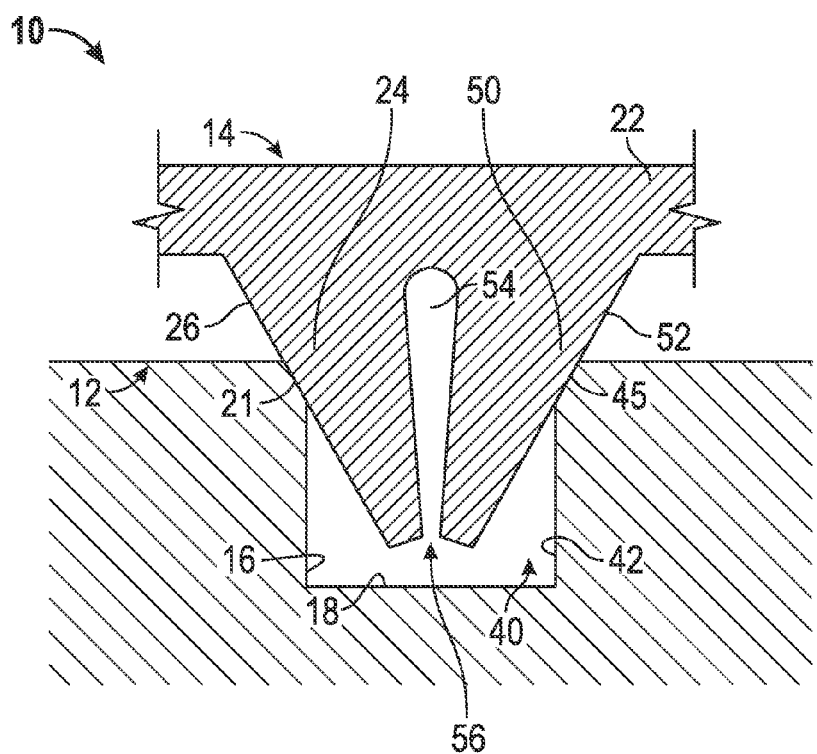
FIG. 7 is a cross-sectional view, taken along line X-X of FIG. 1 of the elastically deformable flange locator arrangement according to a fourth embodiment.

Referring now to FIG. 7, a fourth embodiment of the elastically deformable flange locator arrangement 10 is illustrated in greater detail. The fourth embodiment is similar in many respects to the above-described embodiments, such that duplicative description of the previously described components and features is not necessary. Furthermore, identical reference numerals are employed for previously described elements where appropriate.

In addition to the first portion 22 and the second portion 24 of the second component 14, a third portion 50 is included in the third embodiment. The third portion 50 is constructed and oriented similarly to that of the second portion 24 and includes a third portion engagement surface 52. Similar to the second embodiment, the first component 12 includes the channel 40 having the first channel engagement surface 16, the base wall 18 and the second channel engagement surface 42. Extending longitudinally through the second component 14 is a recess 54 disposed between the second portion 24 and the third portion 50. The recess 54 extends from an end 56 toward the first portion 22 of the second component 14.

The second portion 24 and the third portion 50 of the second component 14 are positioned and engaged with the channel 40 of the first component 12 upon translation of the second component 14 toward the base wall 18. The second engagement surface 26 and the third portion engagement surface 52 engage the first channel engagement surface 16 and the second channel engagement surface 42, respectively, at a position spaced from the base wall 18 within the channel 40. Subsequent translation of the second portion 24 and the third portion 50 toward the base wall 18 results in an elastic deformation at an interface between the first channel engagement surface 16 and the second engagement surface 26, as well as at an interface between the third portion engagement surface 52 and the second channel engagement surface 42. Depending on the positional variance of the features of the first component 12 and the second component 14, elastic deformation of one or both of the second portion 24 and the third portion 50 may occur in response to resistance imposed on the second engagement surface 26 and the third portion engagement surface 52 by the channel 40. It is to be appreciated that elastic deformation of the second portion 24 and the third portion 50 is further facilitated by the presence of the recess 54 disposed between the second portion 24 and the third portion 50. The void of material proximate the recess 54 enhances the flexibility of the second portion 24 and the third portion 50 in regions closely located to the recess 54. Elastic averaging of the elastic deformation of the second component 14 is averaged in aggregate between the second portion 24 and the third portion 50, similar to the elastic averaging described in detail above.

Figure 8:
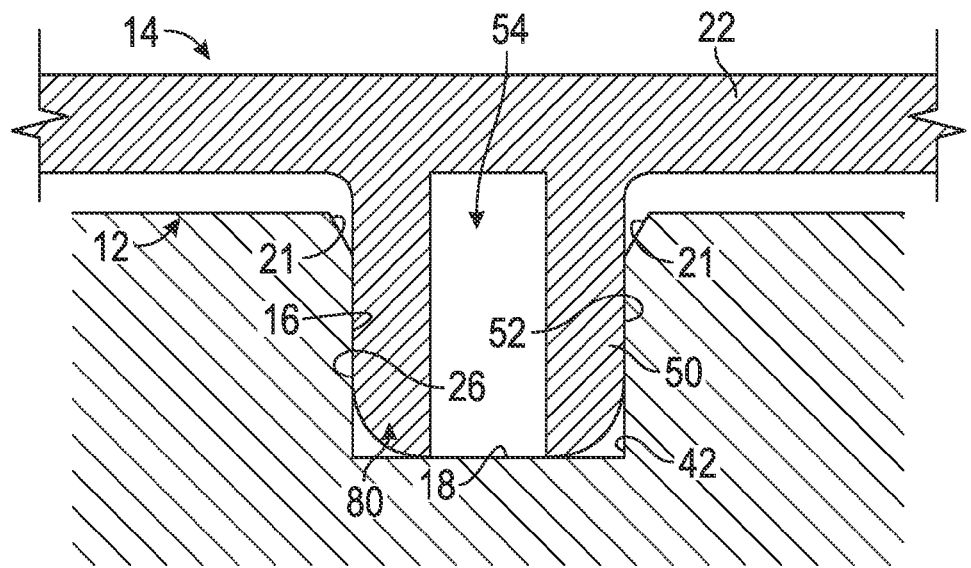
FIG. 8 is a cross-sectional view, taken along line X-X of FIG. 1 of the elastically deformable flange locator arrangement according to a fifth embodiment.
Figure 9:
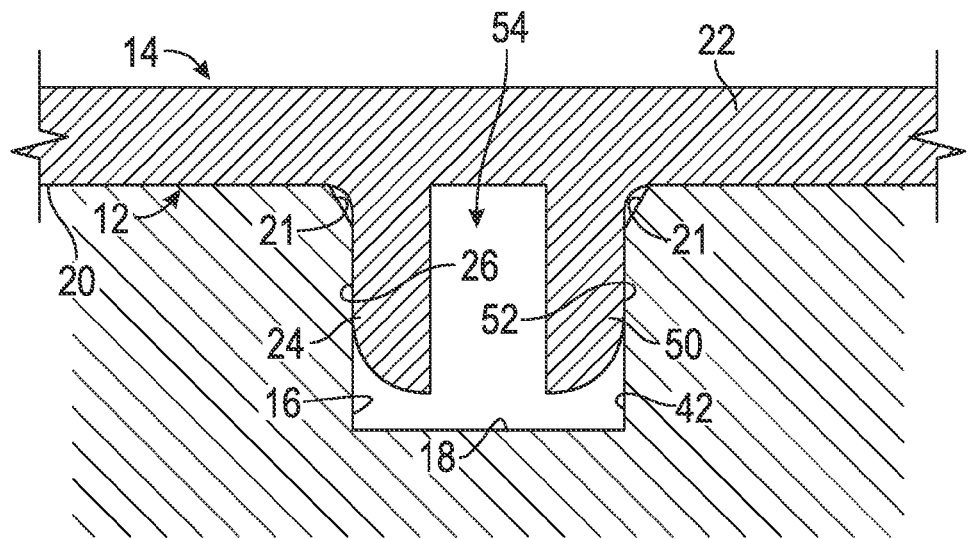
FIG. 9 is a cross-sectional view, taken along line X-X of FIG. 1 of the elastically deformable flange locator arrangement according to a sixth embodiment.

Referring to FIGS. 8 and 9, additional embodiments of the elastically deformable flange locator arrangement 10 are shown. Both embodiments are similar to the fourth embodiment described above in conjunction with FIG. 7, based on the presence of the recess 54 disposed between the second portion 24 and the third portion 50 of the second component 14. In both additional embodiments, the second engagement surface 26 and the third engagement surface 52 are aligned relatively perpendicularly to the first portion 22 of the second component 14 and to the base wall 18 of the first component 12.

As with previous embodiments, the first component 12 also includes the chamfer portion 21 for lead-in purposes, but the second engagement surface 26 of the second portion 24 primarily engages the first channel engagement surface 16 along a portion of the first channel engagement surface 16 that is similarly aligned in a substantially orthogonal manner to the base wall 18. Similarly, the third portion engagement surface 52 of the third portion 50 primarily engages the second channel engagement surface 42 along a portion of the second channel engagement surface 42 that is similarly aligned in a substantially orthogonal manner to the base wall 18.

In one embodiment (FIG. 8), the lengths of the second portion 24 and the third portion 50 are configured to serve as a depth locator component 80 that engages the base wall 18. In another embodiment (FIG. 9), the depth of insertion is controlled by engagement between the elevated wall 20 and the second component 14.

Figure 10:
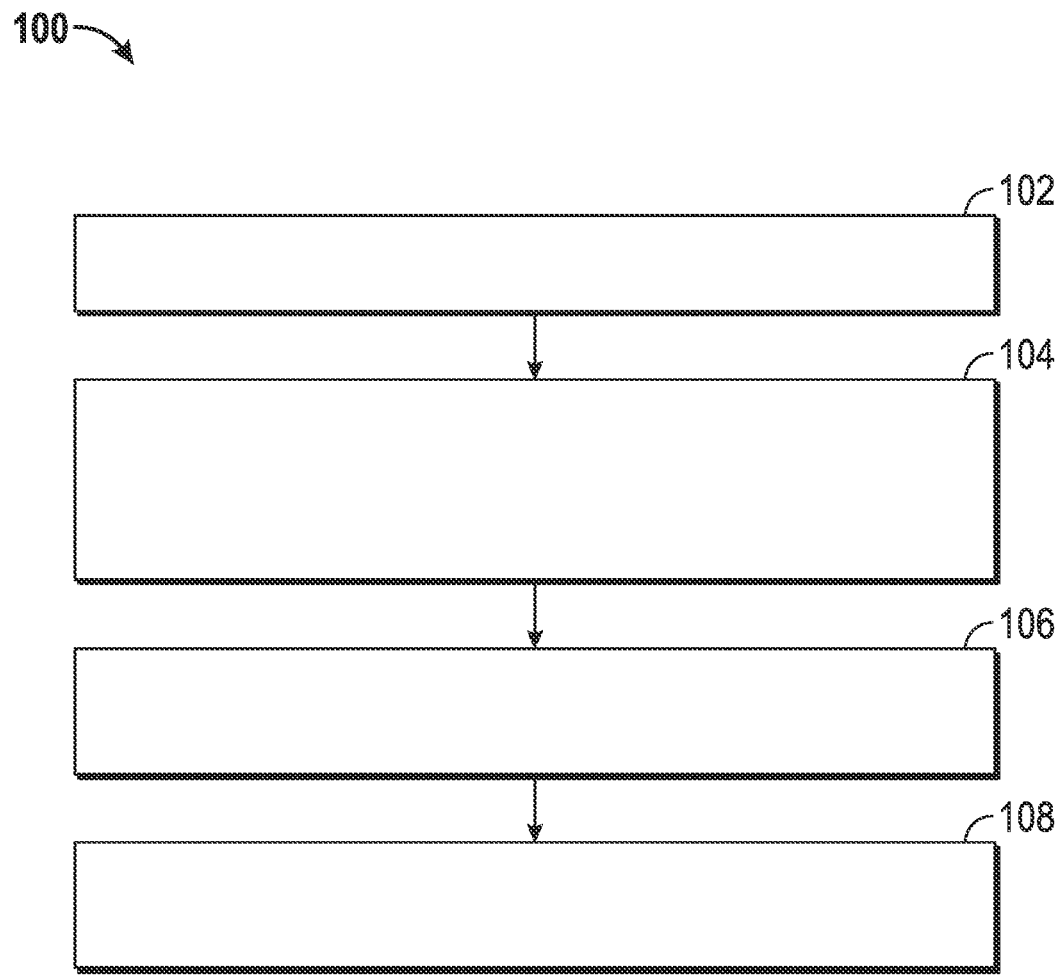
FIG. 10 is a flow diagram illustrating a method of reducing positional variation of mated components.

A method of reducing positional variation of mated components 100 is also provided, as illustrated in FIG. 10, and with reference to FIGS. 1-9. The elastically deformable flange locator arrangement 10, and more particularly the engagement regions of the first component 12 and the second component 14 have been previously described in various embodiments and specific structural components need not be described in further detail. The method of reducing positional variation 100 includes forming 102 the first engagement surface 16 in the first component 12. The method also includes contacting 104 the second engagement surface 26 of the second portion 24 of the second component 14 with the first engagement surface 16. The second portion 24 is elastically deformed 106 upon contacting the second engagement surface 26 with the first engagement surface 16. The method further includes performing an elastic averaging 108 of the elastic deformation. The principles of elastic averaging are described above in detail.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An automotive lighting assembly comprising:
   an automotive lighting housing;
   a channel formed and extending proximate a housing perimeter of the automotive lighting housing, the channel comprising a first channel engagement surface and a second channel engagement surface;
   a lens configured to be mated with the automotive lighting housing;
   a first portion of the lens;
   a second portion and a third portion of the lens, each extending relatively perpendicularly from the first portion proximate a lens perimeter, the second portion having a first lens engagement surface and the third portion having a second lens engagement surface, wherein at least one of the first lens engagement surface and the second lens engagement surface is configured to elastically deform upon contact with the channel of the automotive lighting housing.

2. The automotive lighting assembly of claim 1, further comprising at least one recess disposed between the second portion and the third portion of the lens.

3. The automotive lighting assembly of claim 1, wherein the first channel engagement surface includes a first chamfer portion configured to contact the first lens engagement surface, and wherein the second channel engagement surface includes a second chamfer portion configured to contact the second lens engagement surface.

4. The automotive lighting assembly of claim 1, further comprising:

a lens width defined by the distance between the first lens engagement surface and the second lens engagement surface; and a channel width defined by the distance between the first channel engagement surface and the second channel engagement surface, wherein the lens width is greater than the channel width.

5. The automotive lighting assembly of claim 4, wherein the first lens engagement surface and the second lens engagement surface each extend continuously.

6. The automotive lighting assembly of claim 5, further comprising a fully engaged position of the second component, wherein the fully engaged position comprises contact between the first lens engagement surface and the second lens engagement surface with the channel along an entirety of a length of the first lens engagement surface and the second lens engagement surface.

7. The automotive lighting assembly of claim 6, wherein an amount of deformation of the second portion and the third portion is averaged in aggregate along the first lens engagement surface and the second lens engagement surface.

* * * * *